(12) United States Patent
Yamamoto et al.

(10) Patent No.: US 12,313,224 B2
(45) Date of Patent: May 27, 2025

(54) HYDROGEN FILLING METHOD, HYDROGEN FILLING APPARATUS, PROGRAM, AND RECORD MEDIUM

(71) Applicant: TOYOTA JIDOSHA KABUSHIKI KAISHA, Toyota (JP)

(72) Inventors: Shota Yamamoto, Toyota (JP); Hiroki Yahashi, Toyota (JP); Eiji Okawachi, Toyota (JP); Toshiyuki Kondo, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/810,676

(22) Filed: Jul. 5, 2022

(65) Prior Publication Data
US 2023/0013040 A1    Jan. 19, 2023

(30) Foreign Application Priority Data

Jul. 19, 2021 (JP) ................. 2021-118815
Nov. 5, 2021 (JP) ................. 2021-180744

(51) Int. Cl.
F17C 5/00     (2006.01)

(52) U.S. Cl.
CPC ........ *F17C 5/002* (2013.01); *F17C 2221/012* (2013.01); *F17C 2227/0157* (2013.01); *F17C 2250/032* (2013.01); *F17C 2250/043* (2013.01); *F17C 2250/0694* (2013.01); *F17C 2260/025* (2013.01); *F17C 2265/065* (2013.01);
(Continued)

(58) Field of Classification Search
CPC ............. F17C 5/002; F17C 2221/012; F17C 2227/0157; F17C 2250/032; F17C 2250/043; F17C 2250/0694; F17C 2260/025; F17C 2265/065; F17C 2270/0168; F17C 2270/0184; F17C 2227/04; F17C 2250/034; F17C 2270/0139; F17C 13/02; Y02E 60/32; Y02E 60/34
USPC ............................................................ 141/1
See application file for complete search history.

(56) References Cited

U.S. PATENT DOCUMENTS

| | | | |
|---|---|---|---|
| 9,109,750 B2 * | 8/2015 | Okawachi | F17C 13/026 |
| 9,735,439 B2 | 8/2017 | Kawaura et al. | |
| 10,995,913 B2 | 5/2021 | Fujita | |

(Continued)

FOREIGN PATENT DOCUMENTS

| | | |
|---|---|---|
| DE | 102016002176 A1 | 8/2017 |
| EP | 3550198 A1 | 10/2019 |

(Continued)

OTHER PUBLICATIONS

JP-4492063-B2 English Translation of Specification (Year: 2023).*
(Continued)

*Primary Examiner* — David Colon-Morales
*Assistant Examiner* — Stephanie A Shrieves
(74) *Attorney, Agent, or Firm* — Hunton Andrews Kurth LLP

(57) ABSTRACT

To enable a hydrogen tank to be efficiently filled with hydrogen even when the hydrogen tank has a large capacity, hydrogen filling at the nozzle flow is prohibited when the nozzle flow of a nozzle is larger than the receptacle flow of a receptacle or when the receptacle flow is unknown under the condition that the nozzle and the receptacle can be connected to each other.

11 Claims, 7 Drawing Sheets

(52) U.S. Cl.
CPC ............... *F17C 2270/0168* (2013.01); *F17C 2270/0184* (2013.01)

(56) References Cited

U.S. PATENT DOCUMENTS

| | | | | |
|---|---|---|---|---|
| 2012/0125480 | A1* | 5/2012 | Inagi | F17C 5/06 |
| | | | | 141/82 |
| 2012/0227864 | A1* | 9/2012 | Mori | F17C 5/06 |
| | | | | 141/95 |
| 2016/0305611 | A1* | 10/2016 | Handa | F17C 13/023 |
| 2017/0074458 | A1* | 3/2017 | Handa | F17C 5/06 |
| 2018/0266633 | A1* | 9/2018 | Fujita | F17C 5/007 |
| 2018/0356270 | A1* | 12/2018 | Mathison | F17C 5/06 |
| 2019/0301678 | A1 | 10/2019 | Yamaguchi et al. | |
| 2020/0276909 | A1* | 9/2020 | Boisen | B60S 5/02 |
| 2020/0411886 | A1* | 12/2020 | Fukunaga | B60L 3/0053 |
| 2021/0239272 | A1* | 8/2021 | Rembutsu | F17C 5/06 |
| 2021/0262618 | A1* | 8/2021 | Handa | F17C 5/06 |
| 2021/0310616 | A1* | 10/2021 | Chae | F17C 7/02 |

FOREIGN PATENT DOCUMENTS

| | | |
|---|---|---|
| EP | 3779263 A1 | 2/2021 |
| JP | 2005069331 A | 3/2005 |
| JP | 4492063 B2 * | 6/2010 |
| JP | 2011047491 A | 3/2011 |
| JP | 2014119103 A | 6/2014 |
| JP | 2015094364 A * | 5/2015 |
| JP | 2015214992 A * | 12/2015 |
| JP | 2017053459 A | 3/2017 |
| JP | 2019002515 A | 1/2019 |
| JP | 2019178758 A | 10/2019 |
| JP | 6624132 B2 | 12/2019 |
| WO | 2011092561 A1 | 8/2011 |

OTHER PUBLICATIONS

JP-2015214992-A English Translation of Specification (Year: 2024).*
JP-2015094364-A English Translation of Specification (Year: 2024).*

* cited by examiner

Fig. 5
| Capacity of hydrogen tank | within range from 30 kg to less than 40 kg | | | | | |
|---|---|---|---|---|---|---|
| Type of filling port | A | | B | | C | |
| Number of filling port(s) | 1 | 2 | 1 | 2 | 1 | 2 |
| Pressure rise rate | 3.9 | 7.8 | 5.9 | 11.8 | 19.6 | - |
| Capacity of hydrogen tank | within range from 40 kg to less than 50 kg | | | | | |
|---|---|---|---|---|---|---|
| Type of filling port | A | | B | | C | |
| Number of filling port(s) | 1 | 2 | 1 | 2 | 1 | 2 |
| Pressure rise rate | 2.6 | 6.5 | 4.7 | 9.4 | 15.7 | - |

Fig. 6

| | | | Receptacle | | | | | | |
|---|---|---|---|---|---|---|---|---|---|
| | | | R1 | R2 | R3 | R4 | R5 | R6 | R7 |
| | | | Pressure A | Pressure B | Pressure C | | Pressure D | | |
| | | | Small flow | Small flow | Small flow | Large flow | Small flow | Moderate flow | Large flow |
| Nozzle | N1 | Pressure A / Small flow | ○ | ○ | ○ | ○ | ○ | ○ | ○ |
| | N2 | Pressure B / Small flow | × | ○ | ○ | ○ | ○ | ○ | ○ |
| | N3 | Pressure C / Small flow | × | × | ○ | ○ | ○ | ○ | ○ |
| | N4 | Pressure C / Large flow | × | × | × | ○ | × | × | ○ |
| | N5 | Pressure D / Small flow | × | × | × | × | ○ | ○ | ○ |
| | N6 | Pressure D / Moderate flow | × | × | × | × | ◎ | ○ | ○ |
| | N7 | Pressure D / Large flow | × | × | × | × | ◎ | ◎ | ○ |

HYDROGEN FILLING METHOD, HYDROGEN FILLING APPARATUS, PROGRAM, AND RECORD MEDIUM

FIELD

The present disclosure relates to hydrogen filling.

BACKGROUND

Patent Literature 1 discloses a hydrogen filling device adapted to transmit information on a vehicle to be filled with hydrogen (for example, the capacity of a hydrogen tank) to a control unit through infrared communication, the control unit specifying hydrogen filling control (protocol). It is shown there that in hydrogen filling, the pressure rise rate is determined by the capacity of the tank, the initial pressure, and the outside air temperature.

CITATION LIST

Patent Literature

Patent Literature 1: JP 2019-2515 A

SUMMARY

Technical Problem

When a large-sized vehicle is a fuel cell electric vehicle, the capacity of hydrogen gas filling within 30 kg, which is provided by the existing standard, cannot keep driving distance of the large-sized vehicle sufficient. In this case, the filling amount at one time increases because the capacity of hydrogen gas increases. Thus, the filling time tends to be longer, and not only filling at a conventional filling speed but also filling at a faster speed (so-called large flow) is necessary for short-term filling.

As described above, conventional hydrogen filling is controlled on the assumption that a hydrogen tank has a capacity up to 30 kg. When conventional control is performed with a hydrogen tank having a capacity more than 30 kg (e.g., hydrogen tank installed in a large-sized vehicle), the filling time may be longer, or the supply of hydrogen may be stopped at the time point when the tank has been filled with 30 kg hydrogen.

In view of the above problems, an object of the present disclosure is to enable a hydrogen tank to be efficiently filled with hydrogen even when the hydrogen tank has a large capacity.

Solution to Problem

As a result of their intensive research, the inventors of the present application found that the factor influencing filling of a hydrogen tank of a particularly large capacity with hydrogen is not only the capacity of the hydrogen tank but also the type of filling port, and a proper pressure rise rate based on these factor is in inverse proportion relation to the capacity of the hydrogen tank.

Here, "pressure rise rate" means rise pressure per unit time in a hydrogen tank, and is represented by, for example, "MPa/min". Hydrogen filling at a proper pressure rise rate allows the hydrogen tank to be efficiently and properly filled with hydrogen.

A nozzle at the head of a hydrogen supply pipe provided in a hydrogen filling apparatus, and a filling port (receptacle) provided at a hydrogen introducing pipe disposed in a fuel cell electric vehicle are connected to each other, and then a hydrogen tank is filled with hydrogen. Usually, there are plural types of nozzle and receptacle according to the allowable maximum hydrogen pressures and maximum hydrogen flows. The connection of a nozzle and a receptacle that are different types from each other may cause some fault in hydrogen filling. For example, such fault tends to be noticeable when a nozzle of a larger allowable maximum hydrogen pressure or maximum hydrogen flow than a receptacle is combined to this receptacle.

For this, one may use a structure of a nozzle and a receptacle which prevents the nozzle and the receptacle from being physically connected to each other, and prohibit hydrogen filling when the nozzle and the receptacle of different types from each other are combined. However, the complete prohibition when such a nozzle and a receptacle are combined causes a case where filling is prohibited to be more often, and prevents efficient hydrogen filling in terms of wide use. Therefore, for efficient filling, the inventors of the present application arrived at an idea that it is a significant benefit for the improvement of efficiency that filling can be performed even when a nozzle and a receptacle that are different types from each other are connected.

Based on the above findings, the present application discloses, as one means for solving the problems, a method of filling a hydrogen tank with hydrogen, the method comprising: prohibiting hydrogen filling at a nozzle flow when the nozzle flow of a nozzle is larger than a receptacle flow of a receptacle or when the receptacle flow is unknown under a condition that the nozzle and the receptacle can be connected to each other.

The method may further comprise performing the hydrogen filling at the receptacle flow or less.

In the method, the nozzle and the receptacle can be connected to each other when a nozzle pressure of the nozzle is equal to or lower than a receptacle pressure of the receptacle.

The method may further comprise: determining a pressure rise rate in the hydrogen filling based on inverse proportion relation to a capacity of the hydrogen tank from a type of receptacle and the capacity of the hydrogen tank.

In the method, a map where a value of the pressure rise rate is determined based on the inverse proportion relation may be created, and the pressure rise rate may be determined by the map.

As another aspect of the present disclosure, disclosed is a hydrogen filling apparatus adapted to fill a hydrogen tank with hydrogen, the apparatus comprising: an accumulator; a compressor, a hydrogen supply pipe, a nozzle disposed at a head of the hydrogen supply pipe; and a control unit controlling the compressor, wherein the control unit performs a calculation of prohibition of hydrogen filling at a nozzle flow when the nozzle flow of the nozzle is larger than a receptacle flow of a receptacle or when the receptacle flow is unknown under a condition that the nozzle and the receptacle can be connected to each other.

In the hydrogen filling apparatus, the control unit may determine that the hydrogen filling is performed at the receptacle flow or less.

In the hydrogen filling apparatus, the nozzle and the receptacle can be connected to each other when a nozzle pressure of the nozzle is equal to or lower than a receptacle pressure of the receptacle.

In the hydrogen filling apparatus, the control unit may perform a calculation of determining a pressure rise rate based on inverse proportion relation to a capacity of the hydrogen tank from a type of receptacle and the capacity of the hydrogen tank.

In the hydrogen filling apparatus, a map where a value of the pressure rise rate is based on the inverse proportion relation may be recorded in the control unit, and the pressure rise rate may be determined by the map.

As another aspect of the present disclosure, disclosed is a program to execute control of filling a hydrogen tank with hydrogen, the program comprising: prohibiting hydrogen filling at a nozzle flow when the nozzle flow of a nozzle is larger than a receptacle flow of a receptacle or when the receptacle flow is unknown.

The program may further comprise determining that the hydrogen filling is performed at the receptacle flow or less.

The program may further comprise: obtaining a pressure rise rate based on inverse proportion relation to a capacity of the hydrogen tank from a type of receptacle and the capacity of the hydrogen tank.

A record medium storing the above program is also disclosed.

Advantageous Effects

According to the present disclosure, a hydrogen tank can be efficiently filled with hydrogen even when the hydrogen tank has a large capacity.

BRIEF DESCRIPTION OF DRAWINGS

FIG. 5 explanatorily shows one example of maps;

FIG. 6 shows one example of nozzles and receptacles connectable and non-connectable to each other.

DESCRIPTION OF EMBODIMENTS

1. Hydrogen Filling Apparatus

Figure 1:
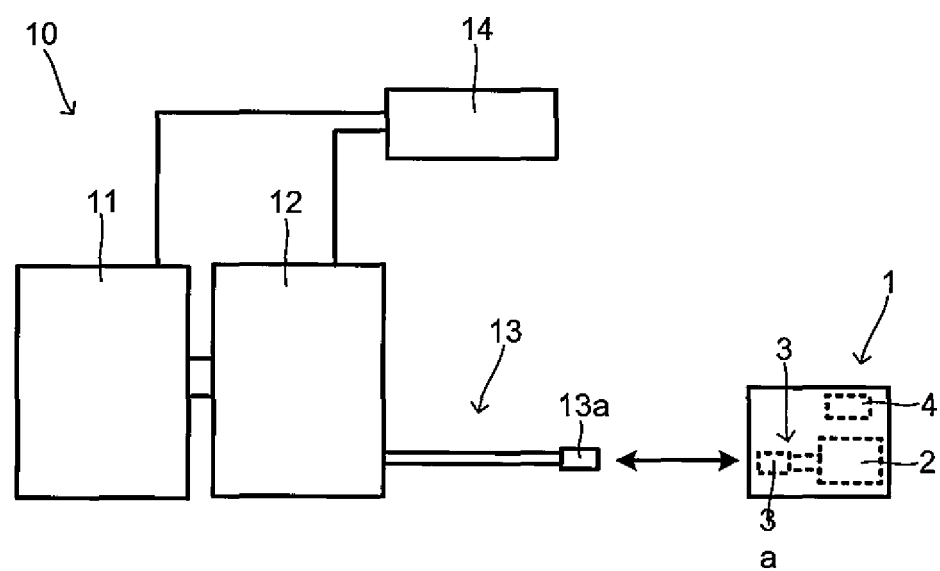
FIG. 1 schematically shows a hydrogen filling apparatus 10.

A hydrogen filling apparatus according to one example will be described with reference to drawings. FIG. 1 conceptually shows a hydrogen filling apparatus 10. The hydrogen filling apparatus 10 is provided at a so-called hydrogen station. Hydrogen is supplied from the hydrogen filling apparatus 10 to a hydrogen tank 2 that is included in an automobile (fuel cell electric vehicle) 1 equipped with a fuel cell.

Here, the fuel cell electric vehicle 1 is as known. A fuel cell system is provided inside a body of the fuel cell electric vehicle 1. The fuel cell system is provided with a fuel cell and the hydrogen tank 2. Hydrogen is supplied from the hydrogen tank 2 to the fuel cell. The fuel cell generates electricity by oxidizing, with a separately supplied oxidizing gas (air), hydrogen that is supplied from the hydrogen tank 2 and used as a fuel gas. A motor that is a driving source of the vehicle is rotated by this generated electricity. According to the present disclosure, as described above, the hydrogen tank 2 can be efficiently filled with hydrogen even when the fuel cell electric vehicle 1 is such a particularly large-sized vehicle that the hydrogen tank 2 has a capacity more than 30 kg.

The hydrogen filling apparatus 10 is provided with an accumulator 11 in which hydrogen is sealed, a compressor 12 to compress (pressurize) hydrogen released from the accumulator 11 to piping, a hydrogen supply pipe 13 to supply the pressurized hydrogen from the compressor 12 to the fuel cell electric vehicle 1, and a control unit 14 controlling the supply of hydrogen. Here, known ones may be used as the accumulator 11, the compressor 12 and the hydrogen supply pipe 13 without any particular limitations. The hydrogen tank 2 is filled with hydrogen by connecting a nozzle 13a provided at the head of the hydrogen supply pipe 13 to a receptacle (filling port) 3a provided at the head of a hydrogen introducing pipe 3 of the fuel cell electric vehicle 1, compressing hydrogen released from the inside of the accumulator 11 by the compressor 12, and passing the released hydrogen through the hydrogen supply pipe 13 and the hydrogen introducing pipe 3 of the fuel cell electric vehicle 1.

Figure 2:
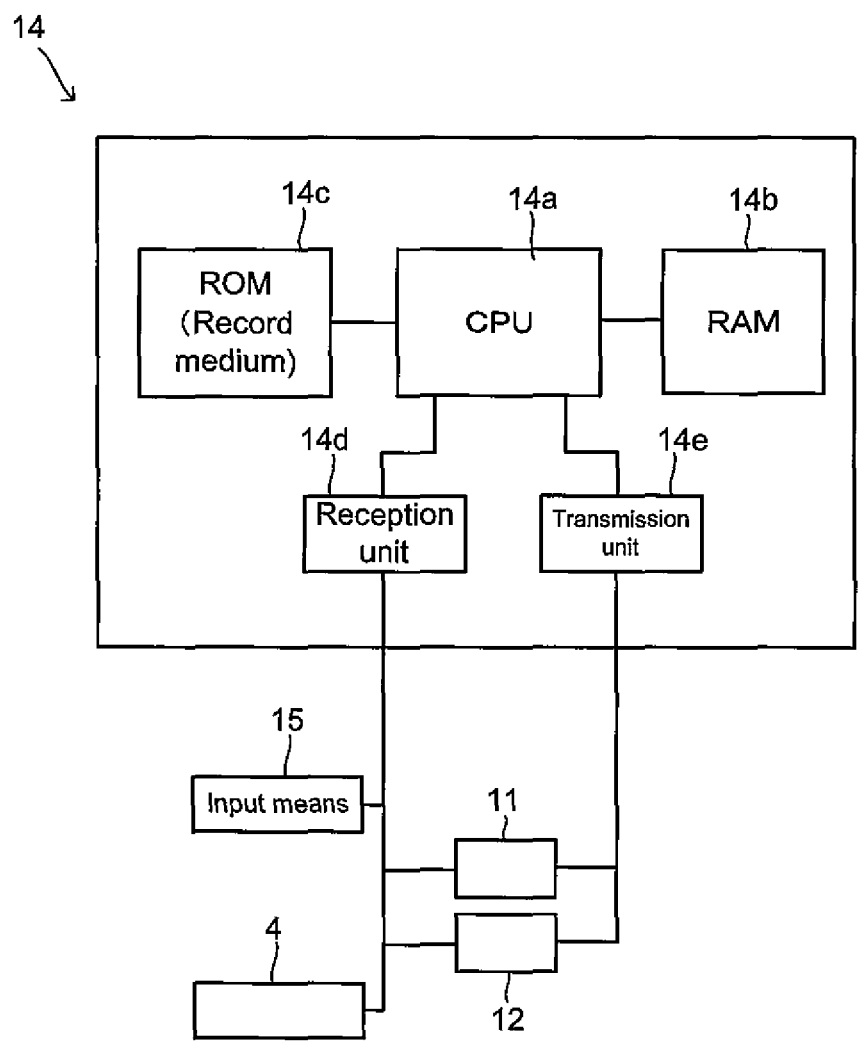
FIG. 2 schematically shows a control unit 14.

The control unit 14 controls respective parts of the hydrogen filling apparatus 10. As conceptually shown in FIG. 2, the control unit 14 is provided with a CPU (Central Processing Unit) 14a that is a processor, a RAM (Random Access Memory) 14b that operates as a work area, a ROM (Read-Only Memory) 14c that operates as a record medium, a reception unit 14d that is an interface for the control unit 14 to receive both wired information and wireless information, and a transmission unit 14e that is an interface for the control unit 14 to transmit both wired information and wireless information to the outside.

Therefore, the control unit 14 is configured to be connected to other devices via the reception unit 14d and the transmission unit 4e so as to be able to transmit and receive signals.

A control program for controlling respective parts of the hydrogen filling apparatus is stored in the control unit 14. In the control unit 14, the CPU 14a, the RAM 14b and the ROM 14c as hardware resources cooperate with the control programs as computer programs. Specifically, the CPU 14a executes, in the RAM 14b that operates as a work area, computer programs recorded in the ROM 14c, thereby enabling various functions. Information acquired or created by the CPU 14a is stored in the RAM 14b.

In this embodiment, the control unit 14 acquires, from the control unit 4 of the fuel cell electric vehicle 1 via the reception unit 14d, the type of filling port (receptacle) 3a of the fuel cell electric vehicle 1, and the capacity of the hydrogen tank 2. The number of the filling port(s) (receptacle(s)) 3a may be acquired if necessary.

In this embodiment, based on the acquired information, the control unit 14 executes computer programs recorded in the ROM 14c, for example, using a database recorded in the ROM 14c, determines the pressure rise rate in hydrogen filling, and records the determined rate in the RAM 14b. The control unit 14 controls the compressor 12 via the transmission unit 14e so that hydrogen filling can be performed at the determined pressure rise rate, and then the hydrogen tank 2 is filled with hydrogen. A specific method of determining the pressure rise rate will be described later.

In addition, the control unit 14 executes computer programs recorded based on information (signals) from provided sensors and devices, and controls respective parts of the hydrogen filling apparatus 10. Examples of the sensors and devices include a hydrogen flow meter, a temperature sensor, a pressure sensor, and valves adapted to control the flow of hydrogen.

2. Hydrogen Filling

Next, hydrogen filling will be described.

2.1. Control of Pressure Rise Rate

The fuel cell electric vehicle 1 is filled with hydrogen as described above. In the present disclosure, when hydrogen filling is performed, the pressure rise rate for hydrogen filling is calculated and hydrogen filling is controlled based on its result. Here, the method of determining the pressure rise rate will be described. Hydrogen filling can be controlled by creating a computer program having a step corresponding to respective steps of this method, storing the created programs in the ROM 14c that operates as a record medium of the control unit 14, and executing the programs. Hereinafter a hydrogen filling method according to one example will be described. A computer program created based on this method functions as one component of the hydrogen filling apparatus 10 by recording this program in the ROM 14c of the control unit 14 as described above.

Figure 3:
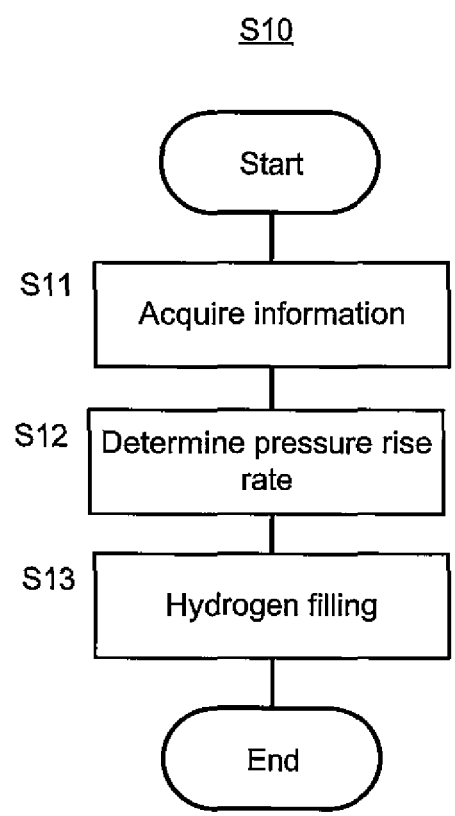
FIG. 3 shows a flow of a hydrogen filling method S10.

FIG. 3 shows the flow of a hydrogen filling method S10 according to one embodiment. As can be seen from FIG. 3, the hydrogen filling method S10 has step S11 of acquiring information, step S12 of determining the pressure rise rate, and step S13 of hydrogen filling. Hereinafter respective steps will be described.

2.1a. Step of Acquiring Information

In step S11 of acquiring information, the type of filling port (receptacle) 3a for hydrogen in the fuel cell electric vehicle 1, and the capacity of the hydrogen tank 2 are acquired from the fuel cell electric vehicle 1, which is to be filled with hydrogen from now on. The number of the filling port(s) 3a may be acquired if necessary.

Information may be either automatically or manually acquired, or may be information recorded in the control unit 14 as a database in advance.

Information may be automatically acquired by, for example, receiving, with the reception unit 14d provided in the control unit 14 of the hydrogen filling apparatus 10, information on the type of filling port (receptacle) 3a, the number of the filling port(s) 3a, and the capacity of the hydrogen tank 2 which is wirelessly transmitted from the control unit 4 installed in the fuel cell electric vehicle 1.

Information may be manually acquired by, for example, receiving, with the reception unit 14d provided in the control unit 14 of the hydrogen filling apparatus 10, information on the type of filling port (receptacle) 3, the number of the filling port(s) 3a, and the capacity of the hydrogen tank 2 via a human input operation with an input means 15 such as a keyboard and a touch panel.

2.1b. Determining Pressure Rise Rate

In step S12 of determining the pressure rise rate, the pressure rise rate in hydrogen filling is determined based on the information acquired in step S11 of acquiring information. In the present disclosure, the pressure rise rate is basically determined by inverse proportion relation to the capacity of the hydrogen tank 2. That is, the pressure rise rate is computed using $$R = K(1/M)$$

where the pressure rise rate is R (MPa/min), and the capacity of the hydrogen tank 2 is M (kg).

Here, K is a coefficient, and is determined by the type of filling port 3a (and further the number of the filling port(s) 3a if necessary), and is obtained in advance by experiment or the like. The temperature in the hydrogen tank and the outside air temperature may be considered when the coefficient K is determined. The coefficient K may be obtained both in view of such temperature, and based on an actual measurement by experiment or any existing map (e.g., SAE J2601 (North American Standard) or JPEC-S 0003 (Japanese Standards)).

Figure 4:
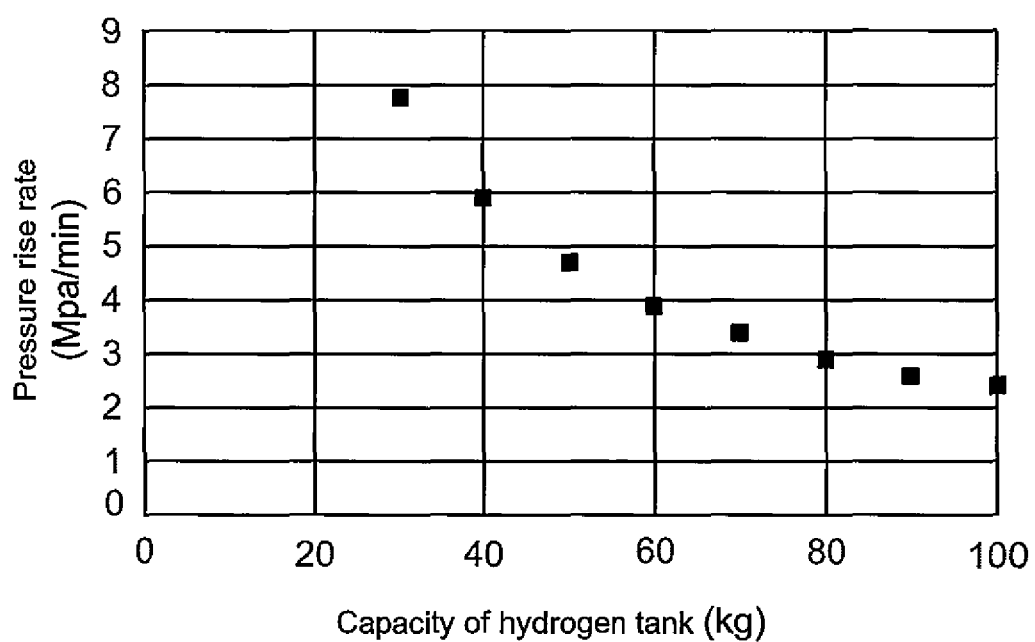
FIG. 4 shows an example of the relation between the capacity of a hydrogen tank and the pressure rise rate.

FIG. 4 is a graph showing the relation between the capacity (kg) of the hydrogen tank and the pressure rise rate (MPa/min) according to one example. The pressure rise rate is obtained from the capacity of the hydrogen tank 2 by applying a relational expression in inverse proportion which is obtained in advance according to the type of filling port 3a (and further the number of the filling port(s) 3a if necessary) like this.

The pressure rise rate can be obtained by calculation as described above each time. The pressure rise rate may be obtained by making classification by predetermined conditions or ranges, obtaining the pressure rise rate according to the classification in advance (in the same way as described above), recording the obtained pressure rise rates in the ROM 14c or the like in the form of a list (map), and calling the map of a classification corresponding to a condition based on the information acquired in step S11 of acquiring information.

For example, as shown in FIG. 5, classification is made according to the hydrogen tank capacity into predetermined ranges (e.g., the range from 10 kg to less than 20 kg, the range from 20 kg to less than 30 kg, the range from 30 kg to less than 40 kg, the range from kg to less than 50 kg, the range from 50 kg to less than 60 kg, . . . ). The respective ranges (classifications) are further classified according to the type of filling port, and the number of the filling port(s), the pressure rise rates are calculated, and the results thereof are shown in the form of a list (map). The pressure rise rate obtained from a map corresponding to a condition is called based on the information acquired in step S11 of acquiring information. These maps may be recorded in, for example, the ROM 14c of the control unit 14.

Similarly, one may make classification according to the type of filling port (and further, the number of the filling port(s) if necessary), further classify the respective types (or the respective numbers) according to the hydrogen tank capacity, calculate the pressure rise rates and show the results thereof in the form of a list (map), and call the pressure rise rate obtained from a map corresponding to a condition based on the information acquired in step S11 of acquiring information.

2.1c. Hydrogen Filling

In step S13 of hydrogen filling, hydrogen filling is performed at the pressure rise rate determined in step S12 of determining the pressure rise rate. Hydrogen filling is performed at a proper pressure rise rate as the supply pressure of hydrogen is adjusted by controlling the compressor 12 by the control unit 14 via the transmission unit 14e based on the information on the determined pressure rise rate.

2.1d. Effect of Controlling Pressure Rise Rate Etc.

The hydrogen filling apparatus 10, and the control of the pressure rise rate by the hydrogen filling method S10 described above allow the hydrogen tank 2 to be efficiently filled with hydrogen even when the hydrogen tank 2 has a particularly large capacity. In other words, for example, the time for hydrogen filling can be shortened, and at the same time the load to the hydrogen tank can be suppressed even when the hydrogen tank has a capacity more than 30 kg (e.g., a hydrogen tank installed in a large-sized vehicle).

The pressure rise rate is computed by the control unit 14 provided in the hydrogen filling apparatus 10 as described above as an example. The present disclosure is not limited to this. In addition to this, the pressure rise rate may be calculated by a control unit (engine control unit or ECU, or the like) 4 provided in the fuel cell electric vehicle 1. At this time, for example, for improvement of safety, one may compare the pressure rise rate obtained in the hydrogen filling apparatus and the pressure rise rate obtained in the fuel cell electric vehicle, and allow filling if the difference between the values thereof is within a certain range and prohibit filling if not, or perform filling at a lower pressure rise rate in both the pressure rise rates.

2.2. Control Based on Relation Between Nozzle and Receptacle

As described above, the nozzle 13a at the head of the hydrogen supply pipe 13 provided in the hydrogen filling apparatus 10, and the filling port (receptacle) 3a provided at the hydrogen introducing pipe 3 disposed in the fuel cell electric vehicle 1 are connected to each other, and then the hydrogen tank 2 is filled with hydrogen. Usually, there are plural types of nozzle 13a and receptacle 3a according to the allowable maximum hydrogen pressures and maximum hydrogen flows. The connection of the nozzle 13a and the receptacle 3a that are different types from each other even allows hydrogen filling, but in some cases, may cause efficiency of the filling to decrease, or some fault. For example, such decrease or fault tends to be shown or occur noticeably when the nozzle 13a of a larger allowable maximum hydrogen pressure or maximum hydrogen flow than the receptacle 3a is combined to this receptacle 3a.

For this, for hydrogen filling, one may configure the combination of the nozzle 13a and the receptacle 3a that are different types from each other in such a way that the nozzle 13a and the receptacle 3a cannot to be physically connected to each other. "Cannot be physically connected" means that at least one of the nozzle 13a and the receptacle 3a has a structure that prevents both from being connected to each other. For example, the receptacle 3a may be provided with a projection to prevent the nozzle 13a from being connected thereto. It is noted that the structure is not limited to this.

On the contrary, however, when the nozzle 13a and the receptacle 3a cannot be connected to each other at all when the nozzle 13a and the receptacle 3a that are different types from each other are combined, a case where filling is prohibited becomes more often, and efficient hydrogen filling in terms of wide use is prevented.

Therefore, in the present disclosure, the combination of the nozzle 13a and the receptacle 3a that are at least some different types from each other is configured in such a way that the nozzle 13a and the receptacle 3a can be physically connected to each other, and then hydrogen filling is controlled by the control unit 14. Further specific descriptions are as follows.

2.2.1. Type of Nozzle and Receptacle

As described above, there are plural types of nozzle 13a and receptacle 3a according to the allowable maximum hydrogen pressures and maximum hydrogen flows. Here, as expressions, "nozzle pressure" means the allowable maximum hydrogen pressure of the nozzle, and "nozzle flow" means the allowable maximum hydrogen flow of the nozzle. Likewise, "receptacle pressure" means the allowable maximum hydrogen pressure of the receptacle, and "receptacle flow" means the allowable maximum hydrogen flow of the receptacle.

The number of the types of nozzle 13a and receptacle 3a is not particular limited. Here, as one example, a description in a case where there are the following types of nozzle 13a and receptacle 3a will be given. The relation among pressures by magnitude is as follows: pressure A<pressure B<pressure C<pressure D. The relation among the flows by volume is as follows: small flow<moderate flow<large flow.

Nozzle 1 (N1): nozzle pressure is pressure A, nozzle flow is small flow
Nozzle 2 (N2): nozzle pressure is pressure B, nozzle flow is small flow
Nozzle 3 (N3): nozzle pressure is pressure C, nozzle flow is small flow
Nozzle 4 (N4): nozzle pressure is pressure C, nozzle flow is large flow
Nozzle 5 (N5): nozzle pressure is pressure D, nozzle flow is small flow
Nozzle 6 (N6): nozzle pressure is pressure D, nozzle flow is moderate flow
Nozzle 7 (N7): nozzle pressure is pressure D, nozzle flow is large flow
Receptacle 1 (R1): receptacle pressure is pressure A, receptacle flow is small flow
Receptacle 2 (R2): receptacle pressure is pressure B, receptacle flow is small flow
Receptacle 3 (R3): receptacle pressure is pressure C, receptacle flow is small flow
Receptacle 4 (R4): receptacle pressure is pressure C, receptacle flow is large flow
Receptacle 5 (R5): receptacle pressure is pressure D, receptacle flow is small flow
Receptacle 6 (R6): receptacle pressure is pressure D, receptacle flow is moderate flow
Receptacle 7 (R7): receptacle pressure is pressure D, receptacle flow is large flow Here, specific values of the nozzle pressure, the receptacle pressure, the nozzle flow, and the receptacle flow are not particularly limited. For example, pressure A may be 11 MPa, pressure B may be 25 MPa, pressure C may be 35 MPa, pressure D may be 70 MPa, small flow may be 60 g/s, moderate flow may be 90 g/s and large flow may be 120 g/s.

2.2.2. Example of Nozzles and Receptacles Connectable and Non-Connectable to Each Other For enabling hydrogen filling, it is necessary that the nozzle 13a and the receptacle 3a can be physically connected. FIG. 6 shows the nozzles and the receptacles connectable and non-connectable to each other in this example. In FIG. 6, the combination of the nozzle and the receptacle that can be connected to each other is indicated by the circle or the double circle, and the combination of the nozzle and the receptacle that cannot be connected to each other is indicated by the cross.

In this example, basically, the nozzle and the receptacle are physically connectable when the nozzle having a nozzle pressure equal to or smaller than the receptacle pressure of the receptacle and having a nozzle flow equal to or smaller than the receptacle flow of the receptacle is combined with this receptacle; and physically non-connectable unless satisfying the above condition.

In this example, as an exception, the nozzle and the receptacle can be connected when the receptacle having a low flow and the nozzle having a moderate or large flow are combined, and when the receptacle having a moderate flow and the nozzle having a large flow are combined under the condition that the nozzle 13a having a nozzle pressure of pressure D and the receptacle 3a having a receptacle pressure of pressure D are combined, as indicated by the double circle in FIG. 6. To ease the conditions for enabling the nozzle and the receptacle to be connected to each other when the nozzle having a higher nozzle pressure and the receptacle having a higher receptacle pressure are combined as described above allows, for example, a case where a hydrogen tank particularly having a capacity more than kg (e.g., a hydrogen tank installed in a large-sized vehicle) is filled with hydrogen to be more often to result in wider use, and thus allows the efficiency for filling to be improved.

2.2.3. Control of Hydrogen Filling

As described above, when the nozzle 13a and the receptacle 3a that can be connected to each other are combined, their connection allows hydrogen filling. In contrast, when the combination of the nozzle and the receptacle is an exception as shown by the double circle in FIG. 6, or when the control unit 14 of the hydrogen filling apparatus 10 cannot recognize the type of receptacle 3a provided in the fuel cell electric vehicle 1, an unconditional flow of hydrogen to the receptacle 3a having a receptacle flow smaller than the nozzle flow of the nozzle 13a based on the nozzle flow makes the occurrence of faults more likely.

Figure 7:
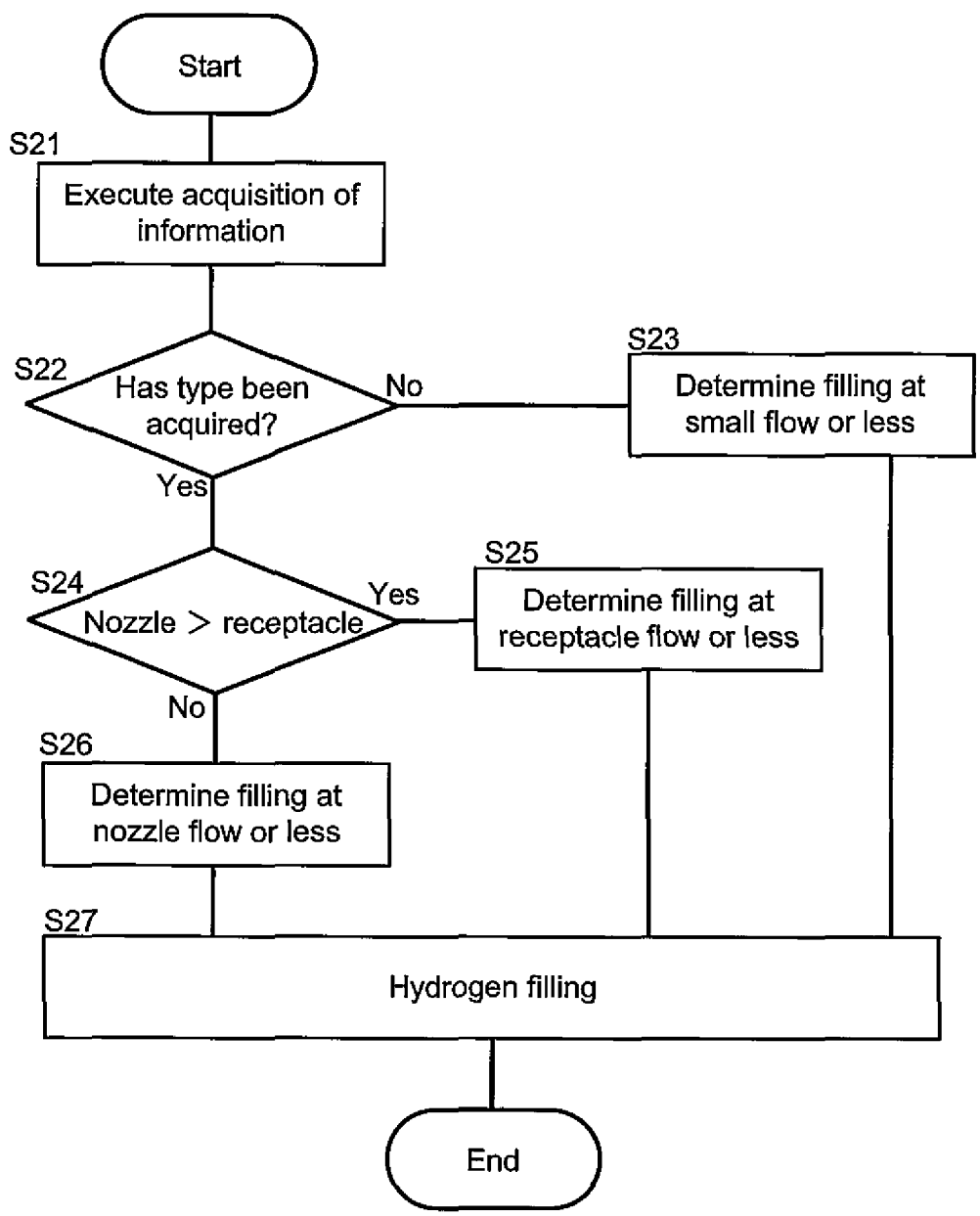
FIG. 7 shows a flow of a hydrogen filling method S20.

Therefore, in this embodiment, in hydrogen filling, the following control is executed, using the control unit 14, on the nozzle 13a and the receptacle 3a in combination which have been physically connected. FIG. 7 shows the flow of a method S20 of this control.

The fuel cell electric vehicle 1 is filled with hydrogen under the control by the method S20 as described below. In this method, hydrogen filling can be also controlled by creating a computer program having a step corresponding to respective steps of this method, storing the created programs in the ROM 14c that operates as a record medium of the control unit 14, and executing the programs. Hereinafter a hydrogen filling method S20 according to one example will be described. A computer program created based on this method functions as one component of the hydrogen filling apparatus 10 by recording this program in the ROM 14c of the control unit 14 as described above.

As can be seen from FIG. 7, the hydrogen filling method S20 has step S21 of executing acquisition of information, step S22 of determining whether or not the type has been acquired, step S23 of determining filling at the small flow or less, step S24 of comparing the nozzle flow and the receptacle flow, step S25 of determining filling at the receptacle flow or less, step S26 of determining filling at the nozzle flow or less, and step S27 of hydrogen filling. Hereinafter the respective steps will be described.

2.2.3a. Step S21 of Executing Acquisition of Information

In step S21 of executing acquisition of information, at least the type of receptacle 3a in the fuel cell electric vehicle 1 is tried to be acquired from the fuel cell electric vehicle 1 to be filled with hydrogen.

The acquisition of information may be executed by, for example, receiving, with the reception unit 14d provided in the control unit 14 of the hydrogen filling apparatus 10, information on the type of receptacle 3a which is wirelessly transmitted from the control unit 4 installed in the fuel cell electric vehicle 1.

2.2.3b. Step S22 of Determining Whether or Not Type has been Acquired

In step S22 of determining whether or not the type has been acquired, it is determined whether the information on the type of receptacle 3a has been acquired in step S21 of executing acquisition of information.

When it is determined that the type of receptacle 3a has been acquired, Yes is selected, and the process moves to step S24 of comparing the nozzle flow and the receptacle flow.

When it is determined that the type of receptacle 3a cannot be acquired, No is selected, and the process moves to step S23 of determining filling at the small flow or less. Here, the reason why the type of receptacle 3a cannot be acquired is not particularly limited. The reason may be that the control unit 4 is originally not installed in the fuel cell electric vehicle 1 and thus any information cannot be outputted, or that the information cannot be outputted due to any fault or the like even when the control unit 4 is installed.

2.2.3c. Step S23 of Determining Filling at Small Flow or Less

When it is determined that the type of receptacle 3a cannot be acquired in step S22 of determining whether or not the type has been acquired, and No is selected, the process moves to step S23 of determining filling at the small flow or less, and it is determined that hydrogen filling is performed at the small flow or less. Thereafter the process moves to step S27 of hydrogen filling, and hydrogen filling is performed based on this determination.

According to this step, hydrogen filling at the nozzle flow is prohibited when the type of receptacle 3a cannot be acquired, and the nozzle 13a and the receptacle 3a have been connected to each other but their relation by flow is unknown. Then, hydrogen filling is performed at the small flow, thereby can prevent faults from occurring.

2.2.3d. Step S24 of Comparing Nozzle Flow and Receptacle Flow

When it is determined that the type of receptacle 3a has been acquired in step S22 of determining whether or not the type has been acquired, and Yes is selected, the process moves to step S24 of comparing the nozzle flow and the receptacle flow, and the nozzle flow and the receptacle flow are compared to each other.

In this step, when it is determined that the nozzle flow is larger than the receptacle flow by the information obtained in step S22 of determining whether or not the type has been acquired, Yes is selected, and the process moves to step S25 of determining filling at the receptacle flow or smaller.

When it is determined that the nozzle flow is equal to or smaller than the receptacle flow by the information acquired in step S22 of determining whether or not the type has been acquired, No is selected, and the process moves to step S26 of determining filling at the nozzle flow or less.

2.2.3e. Step S25 of Determining Filling at Receptacle Flow or Less

When it is determined that the nozzle flow is larger than the receptacle flow in step S24 of comparing the nozzle flow and the receptacle flow, Yes is selected, the process moves to step S25 of determining filling at the receptacle flow or less, and it is determined that hydrogen filling is performed at the receptacle flow or less. Thereafter the process moves to step S27 of hydrogen filling, and hydrogen filling is performed based on this determination.

According to this step, hydrogen filling at the nozzle flow is prohibited when the nozzle flow is larger than the receptacle flow. Hydrogen filling is performed at a flow according to and not exceeding the receptacle flow. Then, faults can be prevented from occurring even when the nozzle and the receptacle that is a type of a receptacle flow smaller than the nozzle flow are connected.

2.2.3f. Step S26 of Determining Filling at Nozzle Flow or Less

When it is determined that the nozzle flow is equal to or smaller than the receptacle flow in step S24 of comparing the nozzle flow and the receptacle flow, No is selected, the process moves to step S26 of determining filling at the nozzle flow or less, and it is determined that hydrogen filling is performed at the nozzle flow or less. Thereafter the process moves to step S27 of hydrogen filling, and hydrogen filling is performed based on this determination.

According to this step, hydrogen filling is performed according to the nozzle flow since the nozzle flow is equal to or smaller than the receptacle flow. Thus, faults can be prevented from occurring.

2.2.3g. Step S27 of Hydrogen Filling

In step S27 of hydrogen filling, hydrogen filling is performed at the flow based on the determination in step S23 of determining filling at the small flow or less, step S25 of determining filling at the receptacle flow or less, or step S26 of determining filling at the nozzle flow or less. Hydrogen filling is performed at a proper flow by, for example, controlling the compressor 12 by the control unit 14 via the transmission unit 14e based on information on the determined flow, and then adjusting the supply pressure of hydrogen.

One may determine the pressure rise rate in hydrogen filling by the above described method S10, and progress the hydrogen filling at the determined pressure rise rate. This allows further efficient hydrogen filling. It is noted that the pressure rise rate is not limited to this.

2.2.4. Effect of Control Based on Relation Between Nozzle and Receptacle Etc.

According to the above described hydrogen filling control with the hydrogen filling apparatus 10, by the hydrogen filling method S20, etc., at least part of the combinations of the nozzle 13a and the receptacle 3a is allowed when the nozzle 13a and the receptacle 3a are different types from each other, and then hydrogen filling can be performed. Thus, a case of hydrogen filling can become more often, and efficient filling in terms of wide use can be performed.

REFERENCE SIGNS LIST hydrogen filling apparatus
11 accumulator
12 compressor
13 hydrogen supply pipe
13a nozzle
14 control unit
S10 hydrogen filling method
S20 hydrogen filling method

What is claimed is:

1. A method of filling a hydrogen tank with hydrogen from a hydrogen filling apparatus, the hydrogen filing apparatus including a control unit, the method comprising:
   physically connecting a nozzle of the hydrogen filling apparatus with a receptacle of the hydrogen tank;
   acquiring, by the control unit, information about a type of the receptacle of the hydrogen tank;
   permitting, by the control unit, hydrogen filling from the nozzle to the receptacle based on the type of the receptacle when a nozzle pressure of the nozzle is equal to or lower than an allowable receptacle pressure of the receptacle, the allowable receptacle pressure being information that the control unit has received; and
   prohibiting, by the control unit, the hydrogen filling at a nozzle flow when the nozzle flow of the nozzle is larger than an allowable receptacle flow of the receptacle, the allowable receptacle flow of the receptacle being information that the control unit has received.

2. The method according to claim 1, further comprising performing, by the control unit, the hydrogen filling at the receptacle flow or less.

3. The method according to claim 1, further comprising:
   determining, by the control unit, a pressure rise rate in the hydrogen filling using a following relational expression:

$R=K(1/M)$, wherein R is the pressure rise rate, M is a capacity of the hydrogen tank, and K is determined, in part, by the information about the type of the receptacle that the control unit has received.

4. The method according to claim 3, wherein
   a map where a value of the pressure rise rate is determined based on the relational expression is created, and the pressure rise rate is determined by the map.

5. A hydrogen filling apparatus adapted to fill a hydrogen tank with hydrogen, the apparatus comprising:
   an accumulator;
   a compressor;
   a hydrogen supply pipe;
   a nozzle disposed at a head of the hydrogen supply pipe; and
   a control unit controlling the compressor, wherein
   the control unit acquires information about a type of a receptacle of the hydrogen tank, after physically connecting the nozzle with the receptacle;
   the control unit permits hydrogen filling from the nozzle to the receptacle when a nozzle pressure of the nozzle is equal to or lower than an allowable receptacle pressure of the receptacle, the allowable receptacle pressure being information that the control unit has received, and
   the control unit performs a calculation of prohibition of the hydrogen filling at a nozzle flow when the nozzle flow of the nozzle is larger than an allowable receptacle flow of the receptacle, the allowable flow of the receptacle being information that the control unit has received.

6. The hydrogen filling apparatus according to claim 5, wherein the control unit determines that the hydrogen filling is performed at the receptacle flow or less.

7. The hydrogen filling apparatus according to claim 5, wherein
   the control unit performs a calculation of determining a pressure rise rate using a following relational expression:

$R=K(1/M)$, wherein R is the pressure rise rate, M is a capacity of the hydrogen tank, and K is determined, in part, by the information about the type of the receptacle that the control unit has received.

8. The hydrogen filling apparatus according to claim 7, wherein
   a map where a value of the pressure rise rate is determined based on the relational expression is recorded in the control unit, and the pressure rise rate is determined by the map.

9. A non-transitory record medium storing a program that causes a computer to execute processing, the program comprising:
   acquiring, by the computer, information about a type of a receptacle of a hydrogen tank, after physically connecting a nozzle of a hydrogen filling apparatus with the receptacle;
   permitting, by the computer, hydrogen filling from the nozzle to the receptacle when a nozzle pressure of the nozzle is equal to or lower than an allowable receptacle pressure of the receptacle, the allowable receptacle pressure being information that the computer has received, and prohibiting, by the computer, the hydrogen filling at a nozzle flow when the nozzle flow of the nozzle is larger than an allowable receptacle flow of the receptacle, the allowable receptacle flow of the receptacle being information that the computer has received.

10. The non-transitory record medium according to claim 9, the program further comprising determining, by the computer, that the hydrogen filling is performed at the receptacle flow or less.

11. The non-transitory record medium according to claim 9, the program further comprising:

obtaining, by the computer, a pressure rise rate using a following relational expression:

$$R=K(1/M),$$

wherein R is the pressure rise rate, M is a capacity of the hydrogen tank, and K is determined, in part, by the information about the type of the receptacle that the computer has received.

* * * * *